United States Patent Office 3,441,551
Patented Apr. 29, 1969

3,441,551
NOVEL CATALYST AND OLEFIN POLYMERIZATION THEREWITH
James L. Jezl, Swarthmore, Habet M. Khelghatian, Springfield, and Louise D. Hague, Villanova, Pa., assignors to Avi Sun Corporation, Philadelphia, Pa., a corporation of Delaware
No Drawing. Filed May 1, 1961, Ser. No. 106,487
The portion of the term of the patent subsequent to Apr. 14, 1981, has been disclaimed
Int. Cl. C08f *1/56, 3/10*
U.S. Cl. 260—93.7                    9 Claims

ABSTRACT OF THE DISCLOSURE

A process for polymerizing propylene and higher olefins with a catalyst consisting of titanium trichloride alkylaluminum dihalide and methyl tetrahydrofuran.

---

This invention relates to a novel catalyst system for the polymerization of propylene and higher 1-alkenes, and more particularly to a three-component catalyst system containing titanium trichloride, an alkyl aluminum dihalide, and methyl tetrahydrofuran.

It is known that 1-alkenes may be polymerized in the presence of catalysts comprising a transition metal halide such as titanium chloride in combination with an aluminum alkyl or dialkyl aluminum halide such as triethyl aluminum or diethyl aluminum monochloride to form solid crystalline polymers having utility in the fabrication of molded articles, films, and fibers. However, it has not been found possible heretofore to use an alkyl aluminum dihalide as an active component of this type of catalyst system even though these dihalides are much less expensive than the alkyl aluminum compounds used thus far. Thus, Stuart and Khelghatian show in U.S. Patent 2,967,206 that alkyl aluminum dihalides in conjunction with titanium halides effect polymerization of propylene and higher 1-alkenes to oily polymers, but no solid polymers are disclosed therein as resulting from the use of this catalyst system.

It is an object of this invention to provide a coordination catalyst system utilizing an alkyl aluminum dihalide as the organometallic component of the catalyst which will polymerize propylene and higher 1-alkenes to solid crystalline polymers in commercially attractive yields.

It has been found according to the present invention that a catalyst system containing titanium trichloride, an alkyl aluminum dihalide and methyl tetrahydrofuran is effective in polymerizing propylene, and other 1-alkenes containing as many as 8 carbon atoms, to solid crystalline polymers. In a specific embodiment of this invention, an activated titanium trichloride is used with the methyl tetrahydrofuran and the alkyl aluminum dihalide. This activated titanium trichloride is defined herein as being predominantly amorphous and may be prepared by ball, or rod, milling crystalline titanium trichloride (prepared by the reduction of titanium tetrachloride with hydrogen or aluminum) until, as determined by X-ray diffraction, it possesses less than 30% of the crystalline structure of the crystalline titanium trichloride prior to ball or rod milling. In practice, the amount of crystallinity is generally 20% or less, and preferably it is 10% or less. Unlike the crystalline titanium trichloride from which it is derived, the predominantly amorphous titanium trichloride will catalyze the preparation of solid polymers of propylene and higher 1-alkenes when it is used in combination with an alkyl aluminum dihalide. However, the amount of solid polymer so prepared is exceedingly small, and such solid polymers can be obtained with such a system only when large, uneconomical amounts of the catalyst composition are used. It has been found, according to the present invention, that commercial polymerization rates may be obtained with the catalyst system containing an alkyl aluminum dihalide and predominantly amorphous titanium trichloride by complexing this system with methyl tetrahydrofuran.

In carrying out polymerizations in accordance with the present invention, the catalyst components are generally dissolved or suspended in an inert hydrocarbon solvent such as hexane, heptane, or octane, or mixtures thereof, in an appropriate reaction vessel, in the substantial absence of oxygen and moisture. The catalyst-containing solvent is then usually brought to a temperature in the range of 25° C. to 150° C., preferably 60° C. to 80° C., and the 1-alkene to be polymerized is introduced into the reaction vessel. When the 1-alkene is a liquid at reaction temperatures, such as 4-methylpentene-1, atmospheric pressure may be used, but when the 1-alkene is normally gaseous, such as propylene or butene-1, moderately elevated pressures are preferably used, as from 20 p.s.i.g. to 500 p.s.i.g., in order to increase the amount of olefin dissolved in the solvent, and thus speed the reaction.

The aluminum component of the catalyst system of this invention may be any alkyl aluminum dihalide, e.g., ethyl aluminum dichloride, propyl aluminum dichloride, butyl aluminum dichloride or the corresponding bromine or iodine analogues thereof, as well as alkyl aluminum dihalides the alkyl radicals of which contain greater numbers of carbon atoms than those illustrated above. The mol ratio of alkyl aluminum dihalide to titanium trichloride in the catalyst system should be generally from 0.2:1 to 10:1, and is preferably from about 1.4:1 to 3:1. The mol ratio of alkyl aluminum dihalide to methyl tetrahydrofuran should be not less than 1.05:1; on the other hand, this ratio should not go above about 4:1. A practical working ratio lies in the range between about 2:1 and about 2:1.75.

In order that those skilled in the art may more fully appreciate the nature of our invention and the manner of carrying it out, the following examples are given. In all examples, the titanium component of the catalyst system was prepared by reducing titanium tetrachloride with aluminum and then ball milling the resultant titanium trichloride until its crystallinity was below about 10% of the original trichloride as determined by X-ray analysis. As a control with which the following examples may be compared, the following experiment was run:

A water-jacketed polymerization reactor was charged with n-hexane, predominantly amorphous titanium trichloride, and ethyl aluminum dichloride in quantities such that the hexane contained 0.07 gram of titanium trichloride per 100 cc. and the aluminum to titanium mol ratio was 2.0:1.0. Anhydrous and oxygen-free conditions were maintained during the polymerization stage. 22 p.p.m. by weight of hydrogen based on hexane followed by propylene were introduced into the reactor until the pressure reached 140 p.s.i.g. and the propylene content of the hexane was 38 mol percent. Polymerization commenced immediately upon the addition of the propylene. The temperature was increased to 160° F., and the polymerization was continued for 3 hours while continuously introducing propylene into the reactor in sufficient quantities to maintain the pressure at 140 p.s.i.g. At the end of this time period the unconsumed propylene was vented and methanol was added to inactivate the catalyst system. Upon working up the reaction product it was found that polypropylene had been produced at the rate of 0.009 pound of polymer per gallon of hexane per hour. This rate is wholly unacceptable commercially. Of the polymer produced, 39.8% was a pentane-soluble waste by-product.

Example I

The procedure of the control was followed, except that the catalyst consisted of ethyl aluminum dichloride, titanium trichloride, and methyl tetrahydrofuran in a mol ratio of 2:1:0.5. The hexane contained 0.07 gram of titanium trichloride per 100 cc., and polymerization was carried out for 4 hours. The rate of production of polypropylene was found to be 0.06 pound per gallon per hour. While this rate is too low to be of commercial interest, it is a considerable improvement over the control. The polymer produced was only 13.1% soluble in boiling pentane.

Example II

The procedure of Example I was followed, but the amount of methyl tetrahydrofuran was increased in an amount such that the mol ratio was 2:1:1. The rate of polymerization was 0.21 pound of polymer per gallon per hour, a commercially acceptable rate, and the polymer produced was only 7.2% soluble in boiling pentane.

Example III

The procedure of Example I was followed, but the amount of methyl tetrahydrofuran was increased in an amount such that the mol ratio was 2:1:1.5. Polymerization time was 2.83 hours. The rate of polymerization was 0.51 pound of polymer per gallon per hour, and the polymer produced was only 5.6% soluble in boiling pentane.

Example IV

The procedure of Example I was followed, but the amount of methyl tetrahydrofuran was increased in an amount such that the mol ratio of aluminum to titanium to oxygen was 2:1:1.75. The rate of polymerization was 0.50 pound per gallon per hour, and 8.0% of the polymer produced was soluble in boiling pentane.

In a further experiment, in which the mol ratio of aluminum ethyl dichloride to titanium trichloride to methyl tetrahydrofuran was 2:1:2, no solid polymer was obtained over a 4 hour reaction period.

While the foregoing examples are limited to the polymerization of propylene, similar increased reaction rates are obtained when polymerizing other alpha-olefins, such as butene-1 or 4-methylpentene-1.

The invention claimed is:

1. In the polymerization of 1-alkenes having at least three and not more than eight carbon atoms to form solid crystalline polymers, the improvement which comprises catalyzing the polymerization with a catalyst consisting essentially of the product obtained by mixing, in a hydrocarbon solvent, an alkyl aluminum dihalide, titanium trichloride, and methyl tetrahydrofuran, wherein the mol ratio of alkyl aluminum dihalide to titanium trichloride is from about 0.2:1 to about 10:1 and the mol ratio of alkyl aluminum dihalide to methyl tetrahydrofuran is from about 1.05:1 to about 4:1.

2. The process of claim 1 wherein said titanium trichloride is predominantly amorphous, prepared by milling crystalline titanium trichloride until its crystallinity is less than 30% of the original crystallinity.

3. The process of claim 2 wherein said alkene is propylene.

4. The process of claim 1 wherein said aluminum to titanium ratio is from about 1.4:1 to about 3:1.

5. The process of claim 4 wherein said alkene is propylene.

6. A polymerization catalyst consisting essentially of the product obtained by mixing, in a hydrocarbon solvent, an alkyl aluminum dihalide, titanium trichloride and methyl tetrahydrofuran, wherein the mol ratio of alkyl aluminum dihalide to titanium trichloride is from about 0.2:1 to about 10:1 and the mol ratio of alkyl aluminum halide to methyl tetrahydrofuran is from about 1.05:1 to about 4:1.

7. The composition of claim 6 wherein said titanium trichloride is predominantly amorphous, prepared by milling crystalline titanium trichloride until its crystallinity is less than 30% of the original crystallinity.

8. The process of claim 4 wherein the alkyl aluminum dihalide is an alkyl aluminum dichloride.

9. The composition of claim 7 wherein the aluminum to titanium ratio is from about 1.4:1 to 3:1 and the alkyl aluminum dihalide is an alkyl aluminum dichloride.

References Cited

UNITED STATES PATENTS

| | | | |
|---|---|---|---|
| 3,099,647 | 7/1963 | Jezl et al. | 260—93.7 |
| 3,063,798 | 11/1962 | Langer et al. | 260—93.7 |
| 3,129,209 | 4/1964 | Hague et al. | 260—93.7 |

FOREIGN PATENTS

| | | |
|---|---|---|
| 564,772 | 8/1958 | Belgium. |
| 809,717 | 3/1959 | Great Britain. |
| 225,990 | 11/1959 | Australia. |

OTHER REFERENCES

Linear and Stereoregular Addition Polymers by N. F. Gaylord, Interscience Publishers, Inc., 1959, pp. 142–5.

JOSEPH L. SCHOFER, *Primary Examiner.*

M. KURTZMAN, *Assistant Examiner.*

U.S. Cl. X.R.

252—429